United States Patent [19]
Griffiths

[11] 4,164,125
[45] Aug. 14, 1979

[54] SOLAR ENERGY ASSISTED AIR-CONDITIONING APPARATUS AND METHOD

[75] Inventor: William C. Griffiths, Lebanon, N.J.

[73] Assignee: Midland-Ross Corporation, Cleveland, Ohio

[21] Appl. No.: 842,679

[22] Filed: Oct. 17, 1977

[51] Int. Cl.² .................................. F25B 27/00
[52] U.S. Cl. .................................. 62/2; 62/238; 62/271
[58] Field of Search .......... 62/2, 238 B, 271; 237/1 A; 165/48, 3, 48 S

[56] References Cited

U.S. PATENT DOCUMENTS

| | | | |
|---|---|---|---|
| 2,083,002 | 6/1937 | Branche et al. | 62/271 X |
| 2,258,730 | 10/1941 | Bichowsky | 62/271 X |
| 2,555,528 | 6/1951 | Angelery | 165/3 X |
| 4,011,731 | 3/1977 | Meckler | 62/271 X |

Primary Examiner—William E. Wayner
Attorney, Agent, or Firm—Harlan E. Hummer

[57] ABSTRACT

An apparatus and a method for air-conditioning by which solar heat is collected and utilized in winter heating and in summer cooling and humidity adjustment. A hygroscopic liquid circulates through a solar heat collector and a reservoir thereof to accumulate sufficient heat to furnish energy for (1) dehumidification, adiabatic cooling of air, and concentrating of the hygroscopic liquid in summertime operation, or alternatively, heating of air in winter time.

15 Claims, 4 Drawing Figures

SOLAR ENERGY ASSISTED AIR-CONDITIONING APPARATUS AND METHOD

BACKGROUND OF THE INVENTION

In recent years, various air-conditioning systems have been devised for utilization of solar energy. Some of these systems utilize a closed absorption refrigeration cycle with solar collectors providing the heat input for the concentrator portion of the absorption refrigeration system (see U.S. Pat. Nos. 2,030,350 and 2,221,971). Such systems require high operating temperatures, e.g., about 200° F. for the solar current collector and are thus hampered by low heat collecting efficiency. Other systems utilize an open absorption system for dehumidification of the conditioned air and employ solar heat collectors for the part of the concentrator which receives heat in an indirect heat exchange relationship (see U.S. Pat. Nos. 2,257,485 and 4,011,731). These systems utilize conventional refrigeration or solar-powered closed-absorption of rankine-cycle refrigeration for removing sensible heat of the conditioned air.

Still other systems utilize an open absorption system for dehumidification of the conditioned air in which heat pumps or total energy systems provide both concentrator heat input and refrigeration for sensible heat removal (see U.S. Pat. Nos. 3,247,679; 3,401,530; and 3,488,971). None of these systems utilize solar energy for concentrator heat input.

The above-mentioned systems in some cases accomplish heat storage for storage of collected solar energy for use during nocturnal periods on cloudy days but these storage systems typically store energy on a sensible heat basis, i.e., merely by elevating the temperature of the liquid in the reservoir which is usually water or an anti-freeze solution. Other systems do not include energy storage of any type, and cooling loads must be handled by auxiliary equipment during nocturnal periods or on cloudy days.

Hence, a principal object of the invention is to provide a method and apparatus for conditioning air on a year-round basis thereby providing heating or cooling of the air as the season requires while using solar energy as the primary energy source.

Another object is to provide a solar-powered air-conditioning system having the ability to store cooling capability in the form of concentrated aqueous hygroscopic solution to thereby provide a much greater cooling-energy storage potential per unit volume and per unit cost of the energy storage reservoir than has heretofore been available, and to reduce the amount of auxiliary energy required for operation during nocturnal or extended cloudy periods and periods in which the ambient temperature is lower than room temperatures.

It is also an object to provide a system for conditioning air by utilizing a solar collector through which an aqueous hygroscopic liquid circulates and is piped into heat exchange relationship with the air to be conditioned in both the cooling and the heating modes of operation with a view to improving efficiency in the utilization of solar energy and reducing system complexity and cost.

SUMMARY OF THE INVENTION

The present invention resides in an open-cycle absorption air-conditioning apparatus and method of which the essential feature is an ability to store energy in a body of hygroscopic liquid not only by absorbing sensible heat but by absorbing large amounts of heat which cause concentration of the solution and elimination of water. This invention further resides in the use of the concentrated hygroscopic liquid to dehumidify the air to be conditioned to make it possible to achieve substantial adiabatic cooling, and thereafter adiabatically cooling the air through evaporation of water resulting from an injection of a dispersion of water into a current of the air. In short, the concentrated hygroscopic solution is used to dry the air and then the air is cooled adiabatically in an air dispersion of water without the aid of refrigeration equipment but with solar energy as the prime energy source.

The air-conditioning system includes one or more solar collectors for directly heating the aqueous hygroscopic solution connected in circuit relation with a reservoir. An essential part of the system is the solution concentrator which is arranged with respect to the circuit to draw off of at least some of the solution passing from the energy collector toward the reservoir, then forming a finely divided dispersion of the drawn off liquid through which a strong current of ambient air is directed, and collecting the concentrated liquid and returning it to the reservoir or other downstream portion of the circuit. In this manner, the energy content of the liquid in the reservoir not only absorbs sensible heat but acquires substantial water absorption ability through loss of water in the concentrator.

To condition the air, an air-processing apparatus assembly is provided for receiving the air to be conditioned, either cooling or heating it, and forcing it into an air-conditioned space. The intake air of the assembly may be withdrawn from the atmosphere but preferably the air-processing assembly has its intake connected with the air-conditioned space as an air source.

In the cooling mode of operation as practiced during summer, the air to be conditioned is first dehumidified by contact with an air dispersion of the hygroscopic solution. Cooling of the dehumidification chamber is preferably accomplished by using a heat exchanger through which is conducted a coolant, such as cooling-tower water, well water or river water. The relatively dry air passing from dehumidification is then cooled in an adiabatic cooling chamber.

In the heating mode of operation, e.g., during winter, the aqueous solution is passed through the solar energy collector and returned directly to the reservoir without passage through the concentrator. The reservoir acts simply as a thermal storage reservoir for nocturnal periods and cloudy days. Heated solution is pumped from the reservoir through a heating coil in the air-processing assembly by which the air to be conditioned is heated to a desired delivery temperature. The solution is returned from the coil to the reservoir.

DESCRIPTION OF PREFERRED EMBODIMENTS

Figure 1:
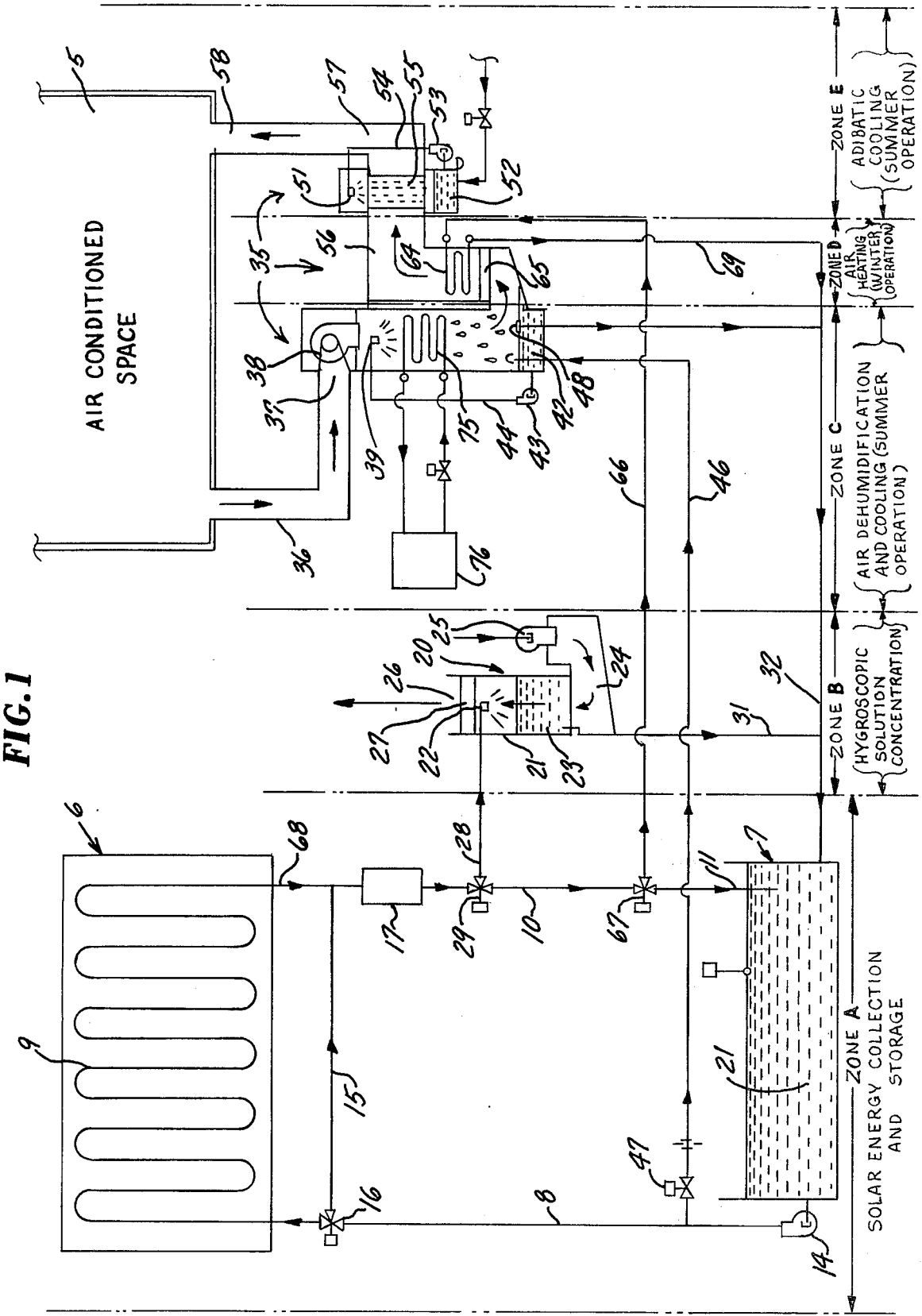
FIG. 1 is a schematic diagram of air-conditioning apparatus embodying the invention which has capability as an air-heating system and includes a solar collector, a direct-contact aqueous solution concentrator, a storage reservoir for the aqueous solution, and an air-processing assembly comprising an absorber, a heating coil, and a direct-contact adiabatic cooler and humidifier.

FIG. 1 illustrates one system in accordance with this invention for utilizing solar energy in the conditioning of air for use in an air-conditioned space 5. For convenience of understanding, the apparatus may be divided into zone A: solar energy collection and storage; zone B: hygroscopic solution concentration; zone C: air dehumidification and cooling (summer operation); zone D: air heating (winter operation); and zone E: adiabatic cooling (summer operation).

The apparatus of zone A comprises a solar collector 6, a reservoir 7, a duct or line 8 connecting the outlet of the reservoir with the inlet end of the sinuous liquid-conducting tube 9 of the collector, a duct or line 10 connecting the outlet end of tube 9 with an inlet 11 of the reservoir. The components just named are arranged in a circuit with which a pump 14 included within the duct 8 near the reservoir outlet may continuously circulate liquid. The circuit as shown further includes a bypass line 15 junctioning with lines 8 and 10 adjacent the collector 6, a three-way control valve 16 located at the junction of lines 8 and 15, and a heater 17 located in the line 10 in adjacent downstream relation with the junction of the lines 15 and 10. Items 15, 16, 17 are useful at times when solar radiation is not sufficient to warrant operation of the collector 6. Accordingly, the air-conditioning apparatus may be powered by an input of energy to the system by the heater 17 with the valve 16 positioned to pass liquid through the bypass line 15 rather than the collector. The liquid circulated in zone A is a hygroscopic solution and may be any of the halide solutions commonly used for reducing the humidity of air. Calcium chloride solution is preferred because of its low cost.

Zone B contains the concentrator 20 by which the concentration of the dissolved material in the liquid 21 of zone A is increased to a sufficient level to maintain the operation of the air dehumidication and adiabatic cooling facilities of zones C and E. The concentrator 20 comprises a housing 21 enclosing a shower device 22, a liquid dispersion-to-air contact chamber 23, a sump 24 and an air pump 25 having its air intake in the atmosphere. Air loaded with moisture taken out of the solution discharged by the shower device 22 is discharged through an opening 26 after passing through a de-mister filter 27. Solution is supplied to the shower device in relatively dilute condition by a line 28 extending to the concentrator from a control valve 29 located in the duct 10. During summer operation, the three-way valve 29 is adjusted to settings which reduce the amount of liquid passing downstream from it through line 10 and increase the amount of liquid passing to the concentrator through line 28. Liquid is returned from the concentrator to the circuit by a line 31 shown joining with line 32 connected directly with the reservoir.

Zones C, D and E relate to portions of the air-processing assembly 35. Zone C contains the absorber portion of the assembly 35 in which dehumidification of a stream of air withdrawn through a duct 36 into an inlet port 37 of the assembly. Zone C is shown including an air fan 38 for pushing the air through the entire assembly. The air flows downstream past a shower device 39 acting to create a fine dispersion from recirculated hygroscopic solution supplied thereto from a sump 42 by way of a pump 43 and a line 44. Concentrated solution is supplied to the sump 42 by way of a line 46 and a valve 47 therein connecting with line 8 of the zone A circuit. Solution is returned to the circuit, e.g., to reservoir 7, through an overflow device 48 and the return line 32. Valve 47 is adjusted to achieve a degree of concentration of solution needed in sump 42 and the shower device 39 to control the rate of dehumidification desired.

The portion of the air-processing assembly 35 in zone E is used simultaneously with the dehumidification apparatus of zone C in summer operation. The degree of dehumidification achieved in zone C determines the potential within the airstream passed on to zone E for adiabatic cooling. Zone E portion of assembly 35 houses a shower device 51 and a sump 52 connected with the shower device by a recirculating pump 53, and a line 54. A fine water dispersion issuing from the device 51 traverses the current of air traversing the adiabatic cooling chamber 55 from a heating chamber 56 of the assembly. The air passes through the outlet port 57 of the assembly and duct 58 for entry into the air-conditioned space 5. Zones C and E are regulated by varying the degree of dehumidification and adiabatic cooling with desired humidification to achieve the temperature and humidity desired in the air discharged to the air-conditioned space.

Zone D is used primarily when zones C and E are inoperative as during the winter time. It may be noted that the current of air to be conditioned flows from zone C portion of the assembly 35 into zone D, i.e., the heating chamber, which contains a heat exchanging coil 64 located downstream from a de-misting filter 65. The coil 64 is connected with a relatively hot portion of the circuit of zone A by a line 66 beginning in a three-way control valve 67 contained in the circuit line 10. Line 66 can thus receive the hotter liquid of the circuit of zone A by being downstream in the circuit from the heater 17 or the discharge end 68 of the collector coil 9. Liquid from the cooler end of the coil 64 is returned through line 69 and line 32 to the reservoir 7.

Figure 2:
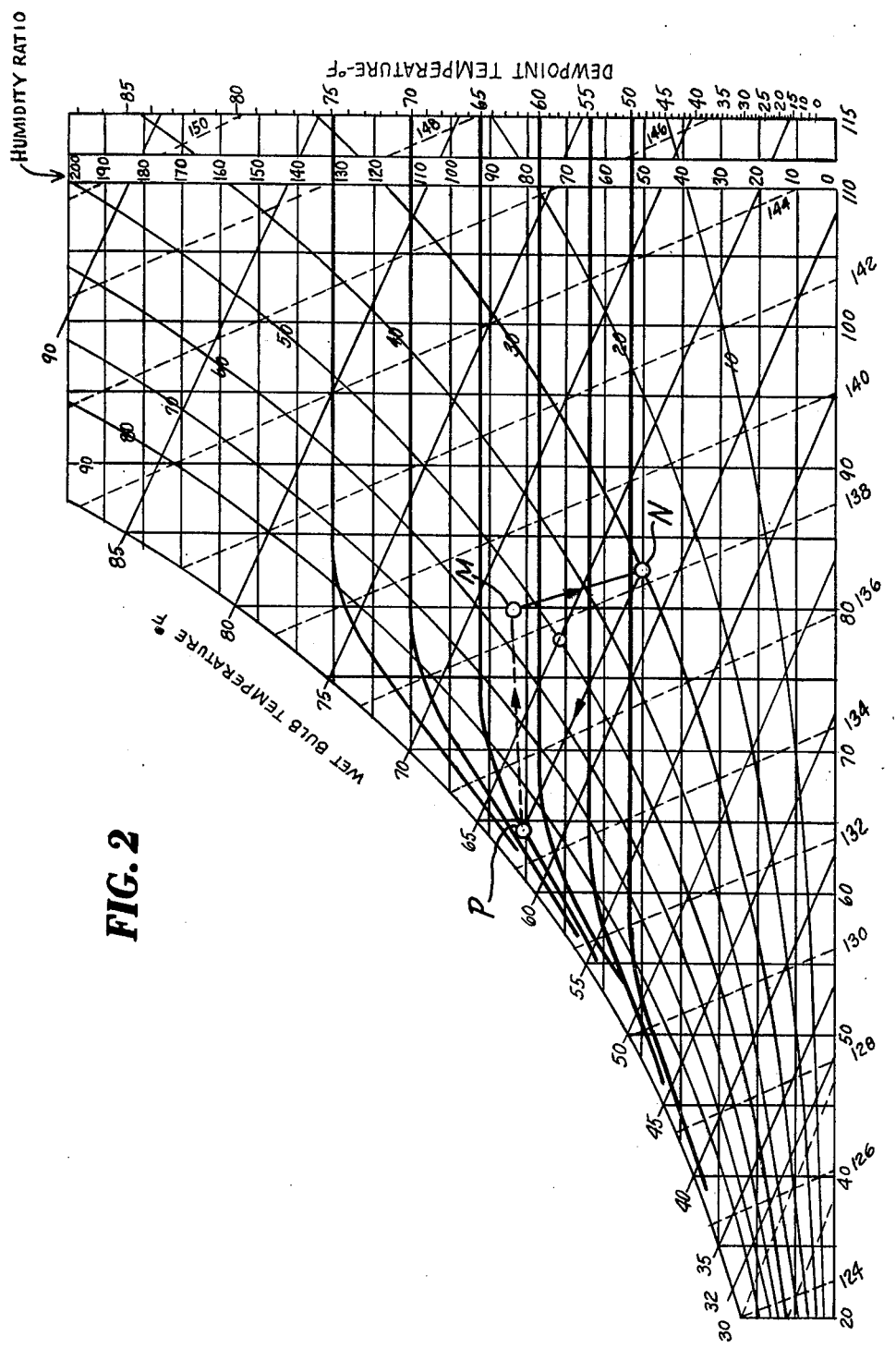
FIG. 2 is a psychrometric chart illustrating a procedure for operating the apparatus of FIG. 1 to affect cooling and humidity control of air.

FIG. 2 shows by way of a psychrometric chart a typical performance of a system according to FIG. 1. Return air from the air-conditioned space 5, point M on the chart, enters the zone C absorber section at 80° F. dry-bulb temperature, 68° F. wet-bulb temperature, and 84 grains per pound absolute humidity. Air leaves zone C, point N on the chart, absorber at 83° F. dry-bulb temperature, 62° F. wet-bulb temperature and 50 grains per pound absolute humidity. The heat lost by the air being cooled from 68° F. to 62° F. wet-bulb temperature is absorbed by the coolant inside a coil 75 of the absorber. The coolant temperature required to obtain this performance is typically 70°–75° F. at the coil coolant inlet manifold. The coolant is supplied from any source represented by reservoir 76. After dehumidification and wet-bulb depression, the air enters the adiabatic humidifier of zone E wherein it is evaporatively cooled to 64° F. dry-bulb temperature, 62° F. wet-bulb temperature, and 80 grains per pound absolute humidity, point P on the chart. This evaporatively-cooled air is supplied to space 5.

Figure 3:
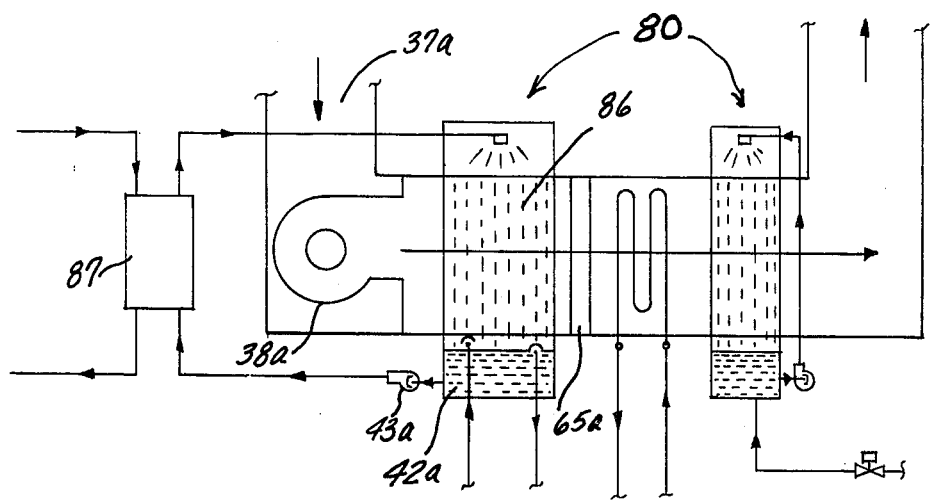
FIG. 3 is a schematic diagram of a modified air-processing assembly showing alternate means for accomplishing dehumidification of air in the absorber while using an aqueous hygroscopic liquid.

FIG. 3 describes an air-processing unit 80 which is modified with respect to the air-processing unit 35 of FIG. 1. In unit 80, the cooling coil 75 of FIG. 1 has been replaced by a contact surface 86 comprising foraminous fibrous or particulate matter and a heat exchanger 87. The hygroscopic liquid from the assembly sump 42a is passed through heat exchanger 87 by pump 43a and cooled therein by the coolant source. The cooled solution is then distributed over the contact surface 86 wherein it dehumidifies and reduces the wet-bulb temperature of the air by direct contact. Essentially, the same system performance can be obtained by using the heat exchanger and contact surface shown in FIG. 3 as by using the cooling coil 75 shown in FIG. 1. In large systems, use of the heat exchanger and contact surface is advantageous in reducing equipment size and cost. Various components of FIG. 3 identified by numerals containing "a" are similar in function to the same respective numerals of FIG. 1 not including "a".

Figure 4:
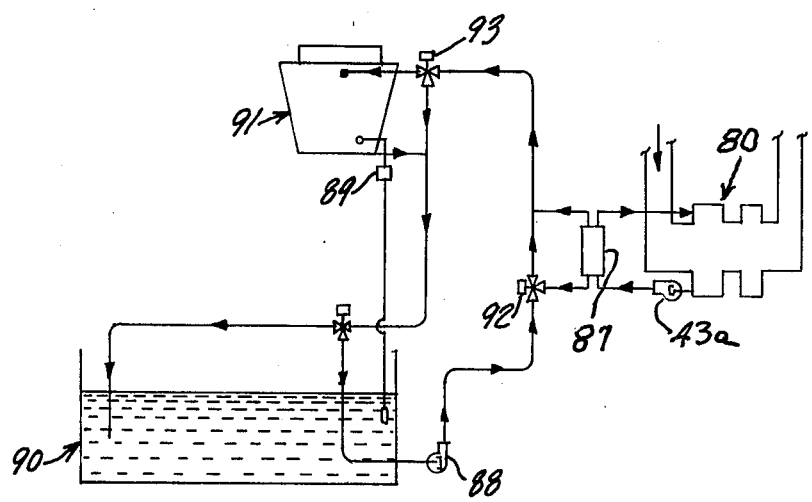
FIG. 4 is a partial schematic diagram showing a modified arrangement of the air-processing assembly in combination with a cooling tower and a cooled water storage reservoir as a cooling means for the absorber.

FIG. 4 illustrates one means of supplying cooling water to the heat exchanger 87 of FIG. 3 or the cooling coil 75 of FIG. 1. This cooling system operates in the following way:

Pump 88 operates whenever cooling is called for and/or whenever the temperature sensor 89 indicates that the cooling tower 91 can supply water colder than that in the cooled water storage tank 90. If cooling is called for, valve 92 diverts the flow of cooling water to the heat exchanger 87 of FIG. 3 or the cooling coil 75 of FIG. 1. (1) If cooling is called for, valve 92 diverts the flow of cooling water to the heat exchanger 87 of FIG. 3 or the cooling coils 74 of FIG. 1. (2) If cooling is called for but temperature sensor 89 indicates that the water in the storage tank 90 is colder than can be generated by the cooling tower 91, valve 93 diverts the cooling water past the cooling tower 91 and returns it to storage tank 90. (3) If cooling is called for and the temperature sensor 89 indicates that the water returning from the cooling tower 91 is colder than that available in the storage tank 90, the valve 94 diverts the flow directly to the inlet of pump 88 so as to supply the coldest water possible to the air-processing assembly 35. (4) If cooling is not called for but the temperature sensor 89 indicates that the cooling tower 91 can supply water colder than that in the storage tank 90, valve 92 bypasses the cooling water past the heat exchanger 83 and valve 93 admits the cooling water to the cooling tower. Cooled water passes from the cooling tower 91 and the valve 94 returns the cooled water to the storage tank 90.

The storage tank 90 contains a volume of cooling water sufficient to act as a heat sink for air-processing assembly 35 during periods of the day when the wet-bulb temperature of the outside air is elevated. Conversely, the cooling tower 91 operates during nocturnal periods when the outside air wet-bulb temperature is depressed, to cool all of the water in the storage tank 90.

What is claimed is:

1. Air-conditioning apparatus for utilizing solar energy comprising:
   a solar heat collector having liquid conducting means;
   a reservoir and a body of hygroscopic liquid contained therein having a predetermined heat capacity;
   connecting means and pumping means for connecting the collector and the reservoir in a circuit for circulating the hygroscopic liquid therethrough;
   solution-concentrating means for withdrawing liquid from one portion of the circuit and returning it in more concentrated condition to another downstream portion of the circuit;
   an enclosure for an air-conditioned space;
   an air-processing assembly connected with said enclosure to withdraw air from one portion and return it to another portion, said assembly having means for advancing a stream of air from said one enclosure portion along a path through the assembly to said other portion and further comprising in the order as follows:
   first liquid-dispersing means for dispersing a stream of said liquid in finely divided condition for contact with essentially all air passing traversing a portion of said path, said dispersing means being connected with one portion of said circuit for withdrawing a liquid therefrom;
   liquid collecting means connected with a portion of said circuit downstream from its connection with said dispersing for returning liquid to said circuit;
   liquid-conducting heat exchange means in heat exchange relation with said air connected with one portion of said circuit for withdrawing heated liquid therefrom and returning the liquid to a portion of said circuit further downstream;
   adiabatic cooling means comprising a second liquid-dispersing means for placing said air in contact with finely divided water; and
   means for supplying water to said second liquid-dispersing means; and
   control means for selectively operating said heat exchange means and said first and second liquid dispensing means.

2. Air-conditioning apparatus for utilizing solar energy comprising:
   solar energy collecting means comprising liquid-conducting means having an inlet end and an outlet end;
   reservoir means having an inlet and outlet;
   first duct means connecting said outlet and said inlet end; and second duct means connecting said outlet end and said inlet;
   a quantity of hygroscopic liquid of predetermined heat capacity contained in said reservoir means;
   pumping means for progressively circulating said liquid through a circuit comprising said first duct means, said liquid conducting means, said second duct means, and said reservoir;
   a solution-concentrating means connected with said circuit for withdrawing some of said liquid from a portion of said circuit and returning it to another downstream portion of said circuit in more concentrated condition;
   an enclosure for an air-conditioned space;
   an enclosed air-processing assembly having inlet port and an outlet port connected with separate portions of said enclosure, said assembly comprising a first chamber connected with said inlet port to receive a stream of air; first liquid dispersing means in the first chamber connected by a third duct means to said circuit to receive liquid from said circulating means and disperse in said stream; fourth duct means for returning liquid after contact with said airstream to a downstream portion of said circuit; second circulating means for propelling said stream of air through said assembly, a second chamber connected with the first chamber and containing a liquid-conducting heat exchanger in supply duct relation with said second duct means and return duct relation with a downstream portion of the circuit; and a third adiabatic cooling chamber connected with said enclosure to discharge said stream of air thereinto containing a second liquid dispersing means for mixing liquid with said stream; and water supply means connected to the second liquid-dispersing means; and control means for selectively operating said heat exchanger and said first and second liquid dispersing means.

3. The air-conditioning apparatus of claim 2 comprising:

a bypass duct connecting with and extending from the first duct means to the second duct means and a three-way valve forming the junction of the first duct means and the bypass duct for redirecting liquid from the reservoir to the second duct means in bypass relation with the reservoir.

4. The air-conditioning apparatus of claim 3 comprising:

heating means included in the second duct means in adjacent downstream relation with a junction of the bypass duct with the second duct means.

5. The air-conditioning apparatus of claim 4 comprising:

in said circuit adjacent said reservoir outlet connected with said three-way valve and said heating means in the second duct means associated with means for actuating said valve and said heating means.

6. The air-conditioning apparatus of claim 1 comprising:

heat exchange means in said first chamber and means for circulating a fluid coolant therethrough.

7. The air-conditioning apparatus of claim 1 wherein:

said first liquid dispersing means is a shower device and said first chamber comprises a sump and said apparatus comprises line and pump means for recirculating liquid from the sump to the shower means, and said third and fourth duct means are connected with said sump.

8. The air-conditioning apparatus of claim 1 wherein:

said solution-concentrating means comprises a shower booth defining a shower area, shower means for spraying said liquid into said area connected with the second duct means, return to duct means for collecting sprayed liquid and returning it to the reservoir means, and blower means for driving air through said area.

9. The air-conditioning apparatus of claim 1 wherein:

said adiabatic means comprises a shower booth, a sump therein, shower means for circulating liquid from the sump to the shower means, and said water supply means is connected with the sump.

10. A method of conditioning air involving the collection and use of solar energy comprising the steps of:

circulating a hygroscopic liquid through a circuit containing a solar energy collector and a reservoir passing air to be conditioned as a current through an air-processing assembly to an air-conditioned space;

dehumidifying the air withdrawing some of said liquid from said circuit and dispersing it within said current of air in one zone of said assembly and returning the used liquid to the reservoir;

adiabatically cooling the air in another zone of the assembly after said dehumidification bypassing the current of air through an adiabatic cooling zone wherein the current of air is subjected to highly dispersed water;

alternatively, when heating of said air current is required, preventing said steps of dehumidification and adiabatic cooling, and heating said current by withdrawing heated liquid from said circuit and directing it through a heat exchanger positioned in a third zone of said assembly within said current air and returning the liquid from the heat exchanger to a portion of said circuit downstream from the point of withdrawal for said liquid; and preventing said withdrawal of liquid for said heating of the air current when performing said dehumidification and adiabatic cooling steps.

11. The method of claim 10 for operating an air-conditioning system comprising:

providing a heat exchanger within that portion of the air-processing assembly wherein said dehumidification step occurs for cooling said current of air.

12. The method of claim 10 for operating an air-conditioning system comprising the step of:

withdrawing a portion of a liquid being circulated through said circuit along a portion of the circuit carrying liquid from the collector to the reservoir, dispersing the withdrawn portion of liquid as a fine dispersion of air within a chamber, and passing an air current through the dispersion to remove water from the liquid, and collecting the dispersed liquid and returning it to the reservoir.

13. The method of claim 10 for operating an air-conditioning system comprising the step of:

conducting said liquid along a path bypassing said collector by providing bypass means in the said circuit between portions of the circuit entering said collector and leaving said collector to enable performance of said air-conditioning steps with heat derived from liquid stored in said reservoir.

14. The method of claim 13 for operating an air-conditioning system comprising the step of:

heating said liquid at a point in said circuit immediately downstream of the junction of the bypass means with that portion of the circuit carrying liquid from the collector to the reservoir.

15. The method of claim 10 for operating an air-conditioning system comprising the step of:

heating the liquid in the portion of the said circuit for carrying liquid from the collector to the reservoir at a point before any withdrawals of liquid are made from said circuit portion for air-conditioning or liquid concentrating purposes.

* * * * *